(12) United States Patent
Barbee et al.

(10) Patent No.: US 6,835,045 B1
(45) Date of Patent: Dec. 28, 2004

(54) ROTOR BLADE PROTECTOR

(76) Inventors: Brent W. Barbee, 4211 B. Renee Ford Rd., Stanfield, NC (US) 28163; E. Andrew Hough, 11646 Bain School Rd., Charlotte, NC (US) 28227

( * ) Notice: Subject to any disclaimer, the term of this patent is extended or adjusted under 35 U.S.C. 154(b) by 1 day.

(21) Appl. No.: 10/434,783

(22) Filed: May 9, 2003

Related U.S. Application Data

(60) Provisional application No. 60/379,518, filed on May 10, 2002.

(51) Int. Cl.[7] .............................................. F01D 25/00
(52) U.S. Cl. .................. 416/62; 416/223 R; 416/244 R
(58) Field of Search ........................... 416/62, 39, 95, 416/1, 46 R, 223 R, 244 R

(56) References Cited

U.S. PATENT DOCUMENTS

| | | | | |
|---|---|---|---|---|
| 5,179,968 A | * | 1/1993 | Deichmann | 135/88.01 |
| 5,306,120 A | * | 4/1994 | Hammer et al. | 416/224 |
| 5,728,465 A | * | 3/1998 | Dorfman et al. | 428/408 |
| 6,017,643 A | * | 1/2000 | Kobayashi et al. | 428/653 |
| 6,109,872 A | * | 8/2000 | McCausland | 416/62 |
| 6,235,370 B1 | * | 5/2001 | Merrill et al. | 428/116 |
| 6,451,434 B1 | * | 9/2002 | Ebisawa et al. | 428/432 |
| 6,468,642 B1 | * | 10/2002 | Bray et al. | 428/216 |
| 6,482,476 B1 | * | 11/2002 | Liu | 427/535 |
| 6,519,901 B1 | * | 2/2003 | Nelson et al. | 52/101 |

* cited by examiner

*Primary Examiner*—Edward K. Look
*Assistant Examiner*—James M. McAleenan
(74) *Attorney, Agent, or Firm*—Miller, Everman & Bernard, PLLC; Gregory R. Everman

(57) ABSTRACT

A protector for protecting aircraft, particularly helicopter rotor blades, from absorbing the sun's infrared rays and the accompanying heat build-up in order to keep adhesive material between spar connections from debonding and to avoid delamination from the rotor blade's composite skin. The rotor blade protector includes a cover configured to encircle the length of the rotor blade and a guide form for installing and removing the cover. The inner surface of the cover is coated, by vacuum deposition technology, with aluminum, titanium, or other metals or alloys. The coating thickness will be in the order of 9–30 billionths of a meter thick. A stripper rod is attached to the guide so that aircraft personnel can install and remove the protector from the helicopter rotor blade while standing on the ground. Optionally, a series of ribs can be provided along the cover to provide increased air insulation around the rotor blade. A further option includes providing a fan at the end terminal end of the cover to increase air circulation over the rotor blade.

20 Claims, 2 Drawing Sheets

ROTOR BLADE PROTECTOR

CROSS REFERENCE TO RELATED APPLICATION

This application claims the benefit of U.S. Provisional Application Ser. No. 60/379,518, filed May 10, 2002.

FIELD OF THE INVENTION

The present invention relates to the art of aircraft cover methods and apparatuses, and more particularly to covers for helicopter rotors.

BACKGROUND OF THE INVENTION

Modern civilian and military helicopters utilize, nearly exclusively, composite blades. Typical composite blades utilize a Nomex honeycomb core with bonded glass skin, such as one or more layers of fiber reinforced plastic, forming the aft fairing portion of the blade. For further reinforcement, Kevlar, carbon or glass fibers are used. The Nomex core is oriented with the open lines of the cells bonded to the top and bottom skins. D-shaped spars, comprising a glass lay-up with a titanium erosion strip, provides structural support within the blades. The spars are bonded together by epoxy or other adhesive material.

Civilian and military helicopters deployed in warm regions, particularly in desert regions, are subjected to the adverse effects of prolonged exposure to direct sunlight. While most helicopters have been designed to operate in extreme temperature conditions, for example, modern day helicopters have been designed to operate in temperature conditions exceeding 130° F., it generally inadvisable to subject the helicopter to extreme temperature conditions for prolonged periods of time. Specifically, high temperatures resulting from absorbing the sun's infrared rays cause bonding deterioration and delamination of helicopter rotor blade components. Debonding is the disintegration of the epoxy or other adhesive materials between spar connections, and delamination is the peeling of layers of the composite skin forming the outer surface of the rotor blade. Both problems contribute to premature rotor blade failure, particularly when under the high wind sheer and vibrations inherent with helicopter operation.

In addition to the ultraviolet effects of the sun, erosion, poor repairs and repeated high cyclical loading exasperates the problem causing minute openings in the skins. The problem is further perpetuated because, in an outdoor environment, helicopters blades are normally tied down placing the top skins of the blades under constant tension and further weakening deteriorated areas of the rotor blade.

Still further, a rotor blade sitting outside in the sun can easily reach 180° F. When heated, the air inside the NOMEX honeycomb core expands and leaks out through any fissures in the skin. Upon cooling, the pressure within the honeycomb core will decrease, and air will be pulled back into the blade, along with any moisture present near the surface of the blade, including rain water, condensation and humidity.

Over time, deterioration of the bonding between the spar connections and delamination of the composite layers not only lead to direct failure of the rotor blades, but also indirectly lead to failure of the blade by allowing water to accumulate and store in the blade's core cavities. Upon significant water accumulation, the track and balance of the rotor blades can become upset, causing operational problems.

Replacement and/or repair of the rotor blades is expensive, time consuming, and requires the highly skilled technician. A replacement blade for a typical military helicopter costs in the neighborhood of between $85,000 and $105,000.

It is known in the art to apply a cover over the rotor hub and rotor blades of a helicopter to provide a shield which mitigates the adverse effects of direct sunlight. For proper function of the cover, it is necessary to consider not only the ability of the cover to reduce aircraft related temperatures, but also other factors such as weight, costs, transportability, ease of installation and removal, resistance to contaminates/chemicals, moisture resistance/breathability, and detectability such as whether detectable infrared signals are created and the degree of glint.

A conventional solution to minimize the effects of excessive exposure to direct sunlight is to house aircraft in containment shelters that shield the aircraft from incident sunlight. However, shelters, either permanent or temporary, often are not practical, interfering with the practical use of the aircraft. For example, aircraft may be deployed in a rapid response condition to underdeveloped locations where contaminate shelters are not readily available. In similar matter, aircraft may be temporarily deployed to satellite locations for limited time durations which make erection of containment facilities non-cost effective. Such shelters are also easily detected by satellite reconnaissance.

Another conventional approach is to drape a canvas cover over the rotor hub and rotor blades of helicopters to provide a shield against direct sunlight. Such canvas covers are difficult to deploy, being bulky and weighty, and often require as many as ten personnel to lift, position, and secure the canvas cover in the proper position. Further, canvas material has a tendency to snag or catch on equipment discontinuities and/or obstructions in the rotor hub area and along the rotor blade, making deployment time consuming. Also, canvas made of non-porous material, tends to maintain moisture and may be moved from proper position by wind conditions or prop wash from adjacent helicopters or aircraft. Most importantly, significant temperature reduction is not achieved through use of a canvas cover.

In response to the unsatisfactory results of conventional covers, the military has sought out new cover configurations and materials to reduce the intense and destructive heat loads presently encountered by aircraft, and to satisfy the other above-listed considerations. These covers failed to provide a complete solution as briefly discussed below:

One such approach is a highly reflective cover comprised of an outer aluminum foil surface bonded to a tight-knit fiberglass fabric inside surface. Although good temperature reduction can be achieved, the cover is very detectable. First, the highly reflective external surface provides tremendous glint. Second, the smooth aluminum foil outer surface sharply reflects infrared signals. Clearly, a cover which enhances the detectability of a covered aircraft is not well suited for military operations. As a further consideration, the aluminum foil is not durable and will debond from the fiberglass inside surface through use and exposure to heat build-up.

Another cover formed of a light weight, highly formable camouflaged material. This cover configuration is largely ineffective in obviating heat build-up, and in some cases may actually contribute to heat build-up.

A further cover is formed of a polyester duck cloth with an optional liner such as a multi-layered quilt with polyester fiber fill and polyester/cotton on either side of a Mylar film. Only moderate temperature reduction was achieved and the bulky cover requires personnel standing on ladders to install.

Additionally, it is important to protect the helicopter, in general, from exposure to the sun's infrared rays and from the accompanying heat build-up. Unprotected aircraft systems, components, and enclosures can deteriorate from the heat build-up resulting in an increased failure rate of the equipment. Heat build-up is particularly problematic in the cockpit area and tends to degrade avionics equipment and reduces the readiness response of the aircraft (while cooling systems are utilized to bring the avionics equipment within operating ranges). High temperatures also create a cockpit environment that is not conducive to maximum pilot efficiency and performance. Likewise, heat radiating from the helicopter causes discomfort for ground and air crew personnel, diminishing their ability to perform duties.

Accordingly what is needed is for an aircraft cover, and particularly a helicopter rotor blade cover, which protects the rotor blade from the adverse effects from prolonged exposure to direct sunlight, and the associated heat build-up. Additionally needed is for the cover to have minimal detectability, with indistinguishable infrared signature and de minimis glint. Further needed is for the cover to be light weight, cost effective, resistant to contaminates, chemicals, moisture, and be easily transported and stored.

DESCRIPTION OF THE PRIOR ART

Applicant is aware of the following U.S. Patents concerning aircraft covers.

| U.S. Pat. No. | Issue Date | Inventor | Title |
| --- | --- | --- | --- |
| 6,109,872 | Aug. 29, 2000 | McCausland | ROTOR BLADE COVER SYSTEM |
| 5,947,686 | Sep. 7, 1999 | Keyes | FAN BLADE COVERS |
| 5,179,968 | Jan. 19, 1993 | Deichmann | CLIMATIC HEAT AIRCRAFT PROTECTIVE SCREEN |
| 3,057,580 | Oct. 9, 1962 | Hahn | AIRCRAFT CONTROL SURFACE PROTECTOR |

The McCausland, U.S. Pat. No. 6,109,872, discloses a helicopter rotor cover system to prevent ice formation on the rotors. The system is comprised of a main rotor cover and a tail rotor cover providing an enclosed space around the rotors, a tubular member connecting enclosed spaces of the two covers and a hot air blower to blow hot air into the two covers. The covers of a tubular member are made from a fabric impermeable to water. For ease of installation and removal, the covers may have separate pieces or openings that are joined with hook and loop fabric fasteners. The main rotor blade covers have oval ribs distributed along the rotor blades to reduce the contact area between the blades and the cover to facilitate flow of air.

Deichmann, U.S. Pat. No. 5,179,968, discloses a climatic heat aircraft protective screen to protect aircraft from adverse effects from direct exposure to sunlight while being relatively insensitive to wind conditions. The screen includes a porous canopy having over hanging eve portions and flat portions that are operated to reflect direct sunlight while allowing air to pass therethrough. Radial deployment strips formed from low friction smooth material may be affixed to the underside of the canopy to facilitate deployment thereof over the main rotor blades of a helicopter. Two ropes are attached to the ends of the deployment strips to facilitate deployment and secure the canopy. A containment bag is affixed to the underside of the canopy into which the canopy can be compactly stowed.

Hann, U.S. Pat. No. 3,057,580, discloses a protector to prevent damage to various surfaces of an aircraft such as ailerons, from hail, freezing rain, and the like. The protector includes a U-shaped body which is contoured to fit over an aircraft control member and seal itself in position over the control member to prevent the entrance of moisture between the protector and the control surface. The U-shaped body is a molded fiberglass member of lightweight construction and easily handled by an operator.

OBJECTS OF THE INVENTION

The principal object of the present invention is to provide a device that protects aircraft systems, particularly helicopter rotor blades, from the effects of infrared solar radiation.

Another object of the invention is to provide a device that reduces the heat load applied to a rotor blade due to exposure to sunlight.

A further object of this invention is to provide a device that has minimal detectability, in particular, indistinguishable infrared signature and glint.

Another object of this invention is to provide a device that can be stowed in minimal space and is easily transportable.

A further object of this invention is to provide a device that is resistant to contaminates, chemicals and is water repellant.

Another object of this invention is to provide a device that is simply and quickly installed on, and removed from, a rotor blade by one person.

BRIEF DESCRIPTION OF THE DRAWINGS

The foregoing and other objects will become more readily apparent by referring to the following detailed description and the appended drawings in which.

DETAILED DESCRIPTION

The present invention is a device and method to protect parked aircraft from the adverse effects of prolonged exposure to direct sunlight. In particular, the invented device is a rotor blade protector which protects helicopter rotor blades from absorbing heat generating infrared rays, thereby reducing accompanying heat build-up which can cause severe debonding and delamination of blade components on military and civilian helicopter rotor blades. Debonding is the disintegration of epoxy or other adhesive materials between spar connections, and delamination is the peeling of layers of the rotor blade composite skin, either of which contributes to premature rotor blade failure. The teachings, as described below, are not merely limited to helicopter rotor blades, but can be applied to other aircraft components by configuring the invented device to properly cover that component.

Figure 1:
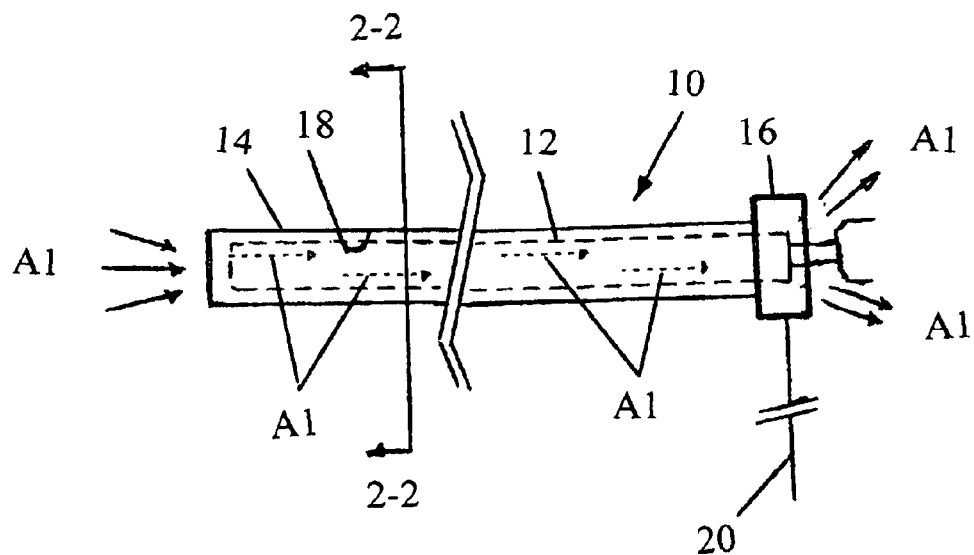
FIG. 1 is an elevated side top view of the invented rotor blade protector in a deployed position, attached to a rotor blade of a helicopter.
Figure 2:
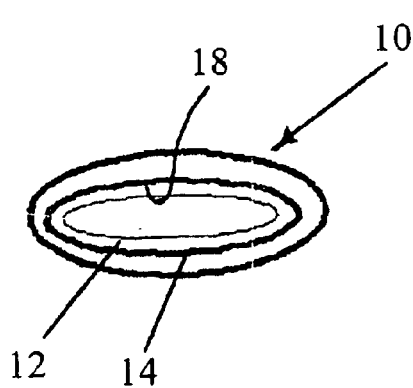
FIG. 2 is a cross-sectional view of the rotor blade protector, the plane of the section being indicated by the line 2—2 in FIG. 1.

Referring now to the drawings, and particularly to FIGS. 1 and 2, the invented rotor blade protector 10 is shown in an installed positioned on a helicopter rotor blade 12. When in the installed position, the rotor blade protector 10 is sufficiently elongate to fully cover and protect the rotor blade 12.

The rotor blade protector 10 includes a tubular, elongate cover 14 to protect the rotor blade 12 and a guide 16 for installing and removing the protector 10. The cover 14 is formed of a single layer of material such as rip-stop, nylon, taffeta, or the like. When installed, the cover 14 is generally ellipsoidal in cross-section. Opposed ends of the protector 10 are open for sliding the protector 10 over the rotor blade 12 and to allow air A1 to circulate through the protector 10 over the rotor blade 12. Grommets are provided on the bottom of the rotor blade protector to prevent moisture build-up, and to contribute to internal airflow. The cover 14 is treated to be resistant to contaminants/chemicals, soil, and is water-repellent. A myriad of interwoven threads forming the cover 14 creates an uneven textured surface, which inhibits inferred signature as discussed below.

The inward facing surface 18 of the cover 14 is coated with aluminum, titanium or other metals or alloys to effectively reflect the sun's inferred rays, and thus reduce accompanying heat buildup. The coating is applied by vacuum deposition technology which evaporates the coating onto the cover at the molecular level. By controlling the thickness of the coating, the infrared signature can be minimized, thus disguising the appearance of the helicopter to satellite recognizance. The preferred coating thickness is in the order of 9–30 billionths of a meter thick. A thicker applied coating tends to undesirably stiffen the cover 14 and becomes more detectable. A thinner coating, such as less than 9 billionths of a meter thick, tends not to be sufficiently reflective. The cover 14 is then flood coated with a UV protectorant. Since the coating is applied to a fabric having an uneven surface due to the myriad of threads comprising the cover 14, infrared signals are diminished and scrambled such that the cover 14 merely looks like a nominal hot spot on the ground from the vantage point of a satellite recognizance.

The coating serves to limit infrared rays from being absorbed by the rotor blade protector 10 or by the rotor blade 12. Accordingly, temperatures are limited to a level beneath where debonding between spar connectors and delamination of the rotor blade composite layers occurs. Moreover, the protector 10 can be printed with a camouflage pattern or dyed to any desirable color to blend the protector 10 into the desired background.

The guide 16 is attached by any suitable means to the cover 14 to assist in installing and removing the cover. The guide 16 is preferably U or V-shaped to loosely fit over the helicopter rotor blade 12 and have sufficient form to hold the end of the cover 14 open to facilitate pulling the cover 14 onto the rotor blade 12. The cover 14, initially bunched within the guide 16, is unraveled as the guide 16 is moved from the terminal end of the helicopter rotor blade 12 towards the helicopter rotor, until the whole blade 12 is covered. Optionally, a soft fabric can be applied to the interior surface of the guide 16 to protect the rotor blade 12 from inadvertent scratching. Similarly, a thin liner can be attached by sewing or other suitable means to the interior of the cover 14 and guide 16 to protect the helicopter blade 12 from being scratched.

When positioned on the rotor blade 12, the protector 10 has an oval cross-section which allows airflow A1 to move along the rotor blade between the two open ends of the protector 10 to cool the rotor blade. Optionally, the terminal end of the protector can be fitted with a solar powered fan assembly (not shown) to actively remove heat from the rotor blade surface.

Figure 3:
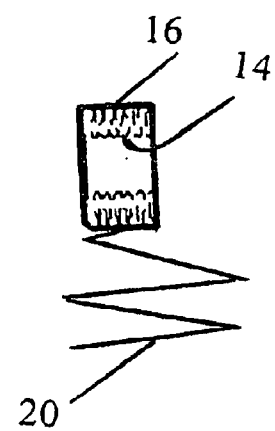
FIG. 3 is a side view of the rotor blade protector, folded and stowed in a guide for installation and removal of the protector.

A stripper handle 20 is secured to the guide 16 by any suitable means so that ground personnel can quickly install and remove the protector 10 from the rotor blade 12 while standing on the ground. A suitable example of a connecting means includes providing a threaded end on the handle which is readily received by a threaded opening in the guide 16. Preferably, the handle 20 is made of fiberglass or carbon fiber and is collapsible to a reduced length by a series of hinges, or by telescopically shortening. FIG. 3 illustrates the protector 10, with the cover 14 housed within the guide 16 and the handle 20 collapsed, ready to be stowed.

Figure 4:
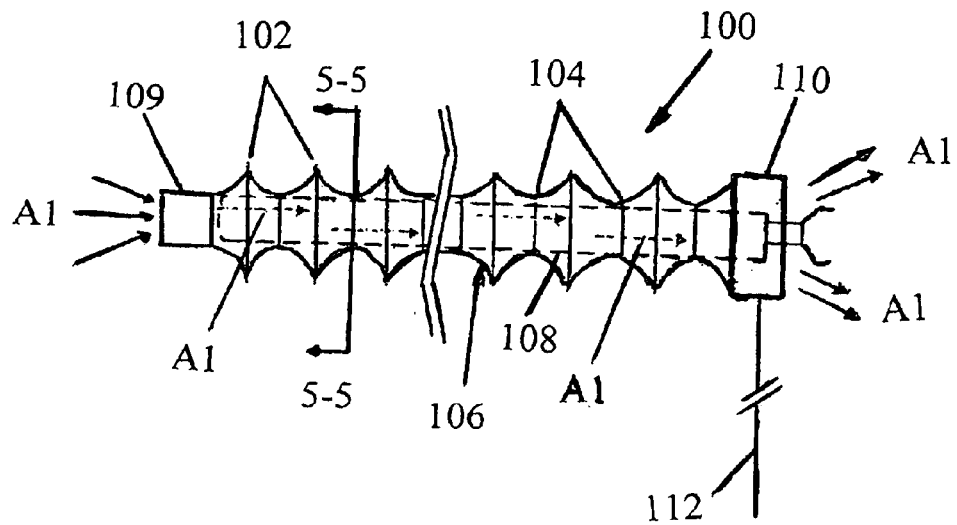
FIG. 4 is an elevated side view of another embodiment of the rotor blade protector, but having ribs, shown in a deployed position on a rotor blade.
Figure 5:
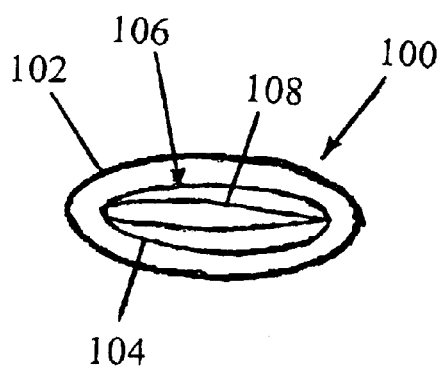
FIG. 5 is a cross-sectional view of the rotor blade protector the plane of the section being indicated by the line 5—5 in FIG. 4.
Figure 6:
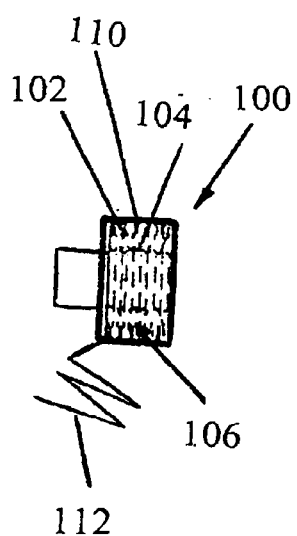
FIG. 6 is a side view of the rotor blade protector, folded and stowed in a guide for installation and removal of the protector.

An alternative embodiment of the rotor blade protector 100 is as shown in FIGS. 4–6. The alternative embodiment is the same as the embodiment described in FIGS. 1–3, but further includes an alternating series of larger and smaller ribs 102, 104 to billow the cover 106 along the length of the rotor blade 108. The ribs 102, 104 are ellipsoidal and preferably oval to keep the cover 106 from resting on the rotor blade 108 and obstructing air flow A1. The smaller diameter ribs 104 are sized to be slightly larger than, or fitted to, the maximum diameter of the rotor blade 108, while the larger ribs 102 billow out the cover 106 to form a series of increased volumes of air around the rotor blade 108. The increased air volumes help insulate the rotor blade 108 and facilitates air movement along the rotor blade 108 to remove heat therefrom. Optionally, the terminal end of the protector 100 can be fitted with a solar powered fan assembly 109 to actively remove heat from the rotor blade surface.

In use, the cover 106 is initially bunched within the guide 110 for storage. Only one ground personnel is needed to install or remove the protector 100 on the rotor blade 108. The ground personnel utilizes the stripper handle 112 to lift the protector 100 into position at the terminal end of the rotor blade 108, then installs the protector 100 on the blade 108 by walking the guide 110 towards the helicopter rotor. As the guide 110 is moved along the rotor blade 10, the cover 106 is pulled out from the guide 110 and unfolded by friction between the rotor blade 108 and cover 106. To remove the protector 100, the ground personnel merely reverses the process by grasping the stripper handle 112 and walking the guide 110 towards the terminal end of the rotor blade 108. During this process, the cover 106 will become refolded within the guide 110 for storage.

SUMMARY OF THE ACHIEVEMENT OF THE OBJECTS OF THE INVENTION

From the foregoing, it is readily apparent that we have invented an improved protector for protecting aircraft, and particularly helicopter rotor blades, from exposure to the sun's infrared rays and the accompanying heat build-up.

Further apparent is that the invented protector can be installed and removed by a single person while standing on the ground and it can be stored in a very small space.

Also apparent is that the invented protector has low incidences of infrared signature and glints.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A cover for protecting aircraft from infrared rays and the accompanying heat build-up, comprising:
  a cover, wherein said cover is configured as a flexible, elongate tube having a first end and a second end and wherein said cover is positionable to encircle a helicopter rotor blade; and
  an aluminum, titanium, metal or alloy coating applied to at least one surface of said cover and having a thickness in the order of 9–30 billionths of a meter thick, wherein said coating is applied to only one side of said cover and wherein a side of said cover that opposes the coating side is dyed or printed.

2. The cover according to claim 1 wherein said ends are sufficiently open such that air can readily flow therethrough.

3. The cover according to claim 2 further including a guide attached to said first end.

4. The cover according to claim 3 wherein said guide is configured to deploy said cover along the rotor blade.

5. The cover according to claim 4 further including a handle attached to said guide and having a sufficient length such that a person can install and remove said cover while standing on the ground.

6. The cover according to claim 1 further including means for providing airflow through said cover.

7. The cover according to claim 6 wherein said airflow means is attached to said second end.

8. The cover according to claim 7 wherein said airflow means is a fan.

9. The cover according to claim 1 further including a first series of ribs disposed along said cover whereby said ribs billow said cover along the rotor blade.

10. The cover according to claim 9 further including a second series of ribs, wherein said second series of ribs have a diameter that is less than said first series of ribs.

11. The cover according to claim 10 wherein said first and second series of ribs are positioned in alternating fashion.

12. A cover for protecting an aircraft from infrared rays and the accompanying heat build-up, comprising:
  a cover, wherein said cover is configured as a flexible, elongate tube having a first end and a second end and wherein said cover is positionable to encompass a helicopter rotor blade; and
  an aluminum, titanium, metal or alloy coating applied to at least one surface of said cover and having a thickness of at least 9 billionths of a meter thick.

13. The cover according to claim 12 wherein said at least one surface includes an inward facing surface and an outward facing surface and wherein said coating is applied only to the inward facing surface.

14. The cover according to claim 12 wherein said ends are sufficiently open such that air may readily flow therethrough.

15. The cover according to claim 12 further including a first series of ribs disposed along said cover whereby said ribs billow said cover.

16. The cover according to claim 12 further including a second series of ribs, wherein each of said second series of ribs have a perimeter that is less than each of said first series of ribs.

17. A protector for protecting an aircraft from infrared rays, comprising:
  a protector having first and second ends, wherein said protector is flexible and elongate and wherein said protector is positionable to cover at least a portion of an aircraft; and
  a coating, having aluminum, titanium, metal or an alloy, on at least one surface of said protector and wherein said coating has a thickness of at least 9 billionths of a meter thick.

18. The protector according to claim 17 wherein said at least one surface includes an inward facing surface and wherein said coating is on the inward facing surface.

19. The protector according to claim 17 further including a first series of ribs disposed along said protector whereby said ribs billow said protector.

20. The protector according to claim 19 further including a second series of ribs disposed along said protector wherein each of said second series of ribs has a shorter perimeter that each of said first series of ribs.

* * * * *